United States Patent
Prost et al.

(10) Patent No.: US 11,358,414 B2
(45) Date of Patent: Jun. 14, 2022

(54) TIRE WITH A TREAD SUB-LAYER CONTAINING MULTIPLE MATERIALS

(71) Applicant: COMPAGNIE GENERALE DES ETABLISSEMENTS MICHELIN, Clermont-Ferrand (FR)

(72) Inventors: Pascal Prost, Clermont-Ferrand (FR); Christopher Careme, Clermont-Ferrand (FR); David Dean, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 396 days.

(21) Appl. No.: 16/320,300

(22) PCT Filed: Jul. 17, 2017

(86) PCT No.: PCT/FR2017/051942
§ 371 (c)(1),
(2) Date: Jan. 24, 2019

(87) PCT Pub. No.: WO2018/020103
PCT Pub. Date: Feb. 1, 2018

(65) Prior Publication Data
US 2019/0232720 A1 Aug. 1, 2019

(30) Foreign Application Priority Data

Jul. 26, 2016 (FR) ........................................ 1657167
Dec. 1, 2016 (FR) ........................................ 1661791

(51) Int. Cl.
*B60C 11/00* (2006.01)

(52) U.S. Cl.
CPC ........ *B60C 11/0008* (2013.01); *B60C 11/005* (2013.01); *B60C 11/0058* (2013.01); *B60C 11/0075* (2013.01)

(58) Field of Classification Search
CPC ............. B60C 11/0058; B60C 11/1281; B60C 2011/0025; B60C 11/0075
See application file for complete search history.

(56) References Cited

U.S. PATENT DOCUMENTS 9,701,161 B2 7/2017 Bondu et al.
10,000,091 B2 6/2018 Gayton et al.
(Continued)

FOREIGN PATENT DOCUMENTS

FR 2954333 A1 6/2011
FR 2999118 A1 6/2014
(Continued)

OTHER PUBLICATIONS

DOW white Paper, Kent Larson, 2019 (Year: 2019).*
International Search Report dated Oct. 5, 2017, in corresponding PCT/FR2017/051942 (4 pages).

*Primary Examiner* — Alison L Hindenlang
*Assistant Examiner* — Debjani Roy
(74) *Attorney, Agent, or Firm* — Venable LLP

(57) ABSTRACT

A tire has a sub-layer (7) made up substantially of a first base layer (71) disposed radially on the crown reinforcement (5) and axially between the median plane (CP) and a transition edge (711), the transition edge (711) being situated axially between the median plane (CP) and a shoulder (60), said first base layer (71) being made up of a rubber compound of given stiffness A, a second base layer (72) disposed radially on the crown reinforcement (5) and axially between the transition edge (711) and a shoulder end (721), said second base layer (72) being made up of a rubber compound of given stiffness B, a covering layer (73) disposed radially on (Continued)

the first base layer (71) and on the second base layer (72) and radially on the inside of the tread (6) and axially at least in sections situated between the median plane (CP) and the shoulder end (721), said covering layer (73) being made up of a rubber compound of given stiffness C, the stiffness B being less than the stiffness A, which is less than the stiffness C, and the stiffness C being greater than the stiffness M.

5 Claims, 5 Drawing Sheets

(56) References Cited

U.S. PATENT DOCUMENTS

| | | | |
|---|---|---|---|
| 10,189,313 B2 | 1/2019 | Schaffhauser et al. | |
| 10,279,629 B2 | 5/2019 | Hashimoto et al. | |
| 2005/0284554 A1* | 12/2005 | Suzuki | B60C 11/01 |
| | | | 152/209.5 |
| 2011/0000594 A1* | 1/2011 | Shima | B60C 11/005 |
| | | | 152/209.18 |
| 2012/0285590 A1* | 11/2012 | Sandstrom | B60C 11/0075 |
| | | | 152/209.5 |
| 2012/0318424 A1 | 12/2012 | Lopitaux et al. | |
| 2015/0151580 A1 | 6/2015 | Boudu, Jr. et al. | |
| 2015/0314651 A1 | 11/2015 | Gayton et al. | |
| 2015/0336431 A1* | 11/2015 | Kaneko | B60C 11/1346 |
| | | | 152/209.24 |
| 2016/0375727 A1 | 12/2016 | Schaffhauser et al. | |
| 2017/0050469 A1* | 2/2017 | Hashimoto | B60C 11/00 |
| 2018/0117972 A1* | 5/2018 | Perrin | B60C 11/0058 |
| 2019/0255887 A1 | 8/2019 | Perrin et al. | |
| 2020/0231012 A1 | 7/2020 | Ferigo et al. | |

FOREIGN PATENT DOCUMENTS

| | | |
|---|---|---|
| FR | 3007693 A1 | 1/2015 |
| JP | 05047404 B2 * | 7/1993 |
| JP | 2001206012 * | 7/2001 |
| JP | 2005015691 * | 1/2005 |
| WO | 2014/005927 A1 | 1/2014 |
| WO | 2015/170615 A1 | 11/2015 |

* cited by examiner

TIRE WITH A TREAD SUB-LAYER CONTAINING MULTIPLE MATERIALS

FIELD OF THE INVENTION

The present invention relates to tyres, and more particularly to a tyre, the performance of which in terms of rolling resistance and road holding is improved.

In general, a tyre is an object with a geometry exhibiting symmetry of revolution about an axis of rotation. A tyre comprises two beads intended to be mounted on a rim; it also comprises two sidewalls connected to the beads, a crown comprising a tread intended to come into contact with the ground, the crown having a first side connected to the radially outer end of one of the two sidewalls and having a second side connected to the radially outer end of the other of the two sidewalls.

The makeup of the tyre is usually described by a representation of its constituent components in a meridian plane, that is to say a plane containing the axis of rotation of the tyre. The radial, axial and circumferential directions denote the directions perpendicular to the axis of rotation of the tyre, parallel to the axis of rotation of the tyre and perpendicular to any meridian plane, respectively. In the following text, the expressions "radially", "axially" and "circumferentially" mean "in a radial direction", "in the axial direction" and "in a circumferential direction" of the tyre, respectively. The expressions "radially on the inside" and "radially on the outside" mean "closer to" and "further away from the axis of rotation of the tyre, in a radial direction", respectively. The equatorial plane CP is a plane perpendicular to the axis of revolution of the tyre, positioned axially so as to intersect the surface of the tread substantially midway between the beads. The expressions "axially on the inside" and "axially on the outside" mean "closer to" and "further away from the equatorial plane of the tyre, in the axial direction", respectively.

PRIOR ART

As is known, tyres for road applications, and very particularly tyres for passenger vehicles make an essential contribution to the performance of the vehicles in terms of rolling resistance (and thus energy efficiency of the vehicles), of grip, of dynamic response for guiding the vehicles (notably when cornering) and of wear (and thus overall cost of using the vehicles). Of the tyre design parameters, a person skilled in the art is aware of the importance of the choice of the material of which the tread is made and the material of which the sub-layer is made. One example of a sub-layer, that is to say of a layer of rubber interposed between the crown reinforcement and the material of the tread, is described in the document FR 2 954 333. In general, sub-layer materials under the tread are used to improve the rolling resistance of the tyre with a material of low hysteresis, or to stiffen the tread in shear, but with modest stiffnesses so as not to excessively counter the flattening of the tread of the tyre in its contact patch in which it is in contact with the ground.

However, the lower the stiffness, the less good the drift thrust response of the tyre is when subjected to stress by the vehicle turning. Specifically, schematically, the stack of layers of rubber radially on the outside of the crown reinforcement can be considered to be a succession of springs in series. It is for this reason that the introduction of materials with too low a modulus is avoided so as not to impair the cornering stiffness. However, this may conflict with the objective of minimizing the rolling resistance. Even in the variants with the greatest stiffnesses, the dynamic shear modulus G* of a sub-layer material is generally much less than 8 MPa, even when the best performance in terms of handling is desired. In the present document, it is noted that the dynamic shear modulus G* in question is the dynamic shear modulus G* measured at 23° C. and under an alternating shear stress at a frequency of 10 Hz and at 10% deformation.

The document WO 2015/170615 also discloses a tyre having a base layer, that is to say a sub-layer, formed of two radially superposed materials. The modulus of the material of the tread and the tg δ (tangent delta) value thereof are lower than the values of the same parameters of the sub-layer material in contact with the tread material, that is to say that of the two radially outermost layers. The modulus of the material of the radially inner layer of the sub-layer materials and the tg δ value thereof are lower than the values of the same parameters of the sub-layer material in contact with the tread material. However, a tyre made according to this teaching does not achieve any progress in terms of the balance of performance properties.

The document FR 2999118 A1 also discloses a tyre in which the tread (and not the sub-layer) is made up of three different rubber compounds, with a very different aim since it is a matter of electrical resistivity. The document WO 2014/005927 A1 also discloses a tyre in which the tread (and not the sub-layer) is made up of two different rubber compounds, with a very different aim since it is a matter of resistance to attack and to wear of a tyre for vehicles of construction plant type. The document FR 3007693 A1 also discloses a tyre in which the tread (and not the sub-layer) is made up of two different rubber compounds.

The objective of the invention is to achieve a better dynamic drift thrust response under turning stress without worsening the rolling resistance of the tyre.

BRIEF DESCRIPTION OF THE INVENTION

The subject of the invention is a tyre having an axis of rotation and a median plane perpendicular to the axis of rotation, and comprising:
- a crown reinforcement,
- a tread radially on the outside of the crown reinforcement, the tread extending axially between two shoulders, the tread comprising a contact face intended to come into contact with the roadway when the tyre is being driven on, the tread being made up of at least one rubber compound of given stiffness M, and
- a sub-layer disposed radially on the outside of the crown reinforcement and radially on the inside of the tread, wherein, at least on one side axially with respect to the median plane, the sub-layer has:
- a first base layer disposed radially on the crown reinforcement and axially between the median plane and a transition edge, the transition edge being situated axially between the median plane and a shoulder, said first base layer being made up of a rubber compound of given stiffness A,
- a second base layer disposed radially on the crown reinforcement and axially between the transition edge and a shoulder end, said second base layer being made up of a rubber compound of given stiffness B,
- a covering layer disposed radially on the first base layer and on the second base layer and radially on the inside of the tread and axially at least in portions situated between the median plane and the shoulder end, said covering layer being made up of a rubber compound of given stiffness C, the stiffness B being less than the stiffness A, which is less than the stiffness C, and the stiffness C being greater than the stiffness M.

In an advantageous embodiment, the covering layer is axially continuous from one shoulder of the tyre to the other shoulder. In a preferred embodiment, the covering layer is formed by several portions that are separated axially, said covering layer being interrupted under the furrows, and, axially at some points, the covering layer is extended radially outwards by at least one reinforcing element extending radially towards the outside of the tread.

DESCRIPTION OF THE FIGURES

The invention will now be described with the aid of the appended drawing, in which.

DETAILED DESCRIPTION OF THE INVENTION

Figure 1:
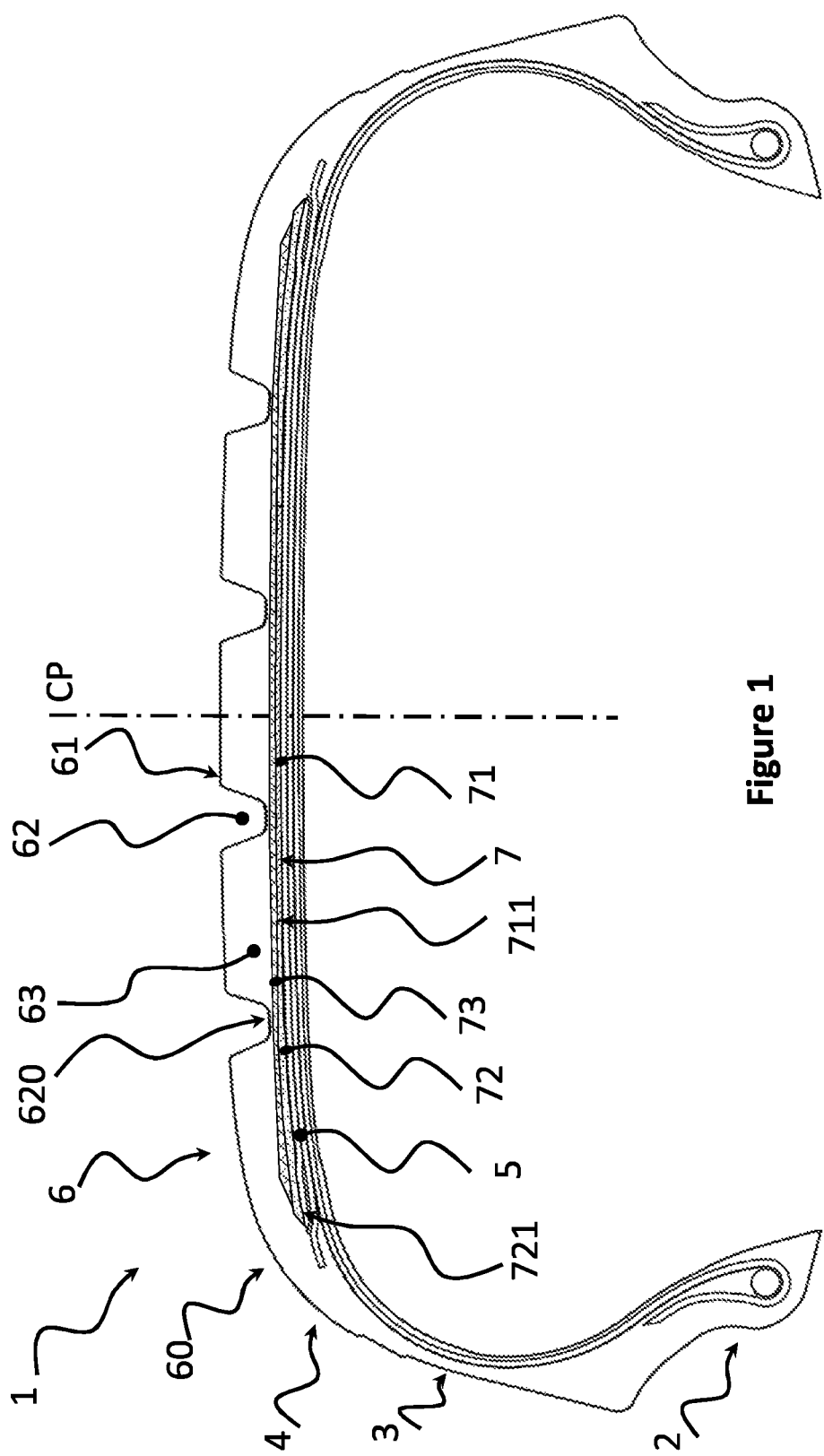
FIG. 1 schematically shows a meridian section through a tyre according to a first embodiment of the invention.

FIG. 1 shows a tyre 1, an equatorial plane CP, two beads 2 and two sidewalls 3 each connected to a bead 2. The tyre has a crown 4, which has a crown reinforcement 5 and a tread 6. The tread extends axially from one shoulder 60 to the other shoulder. The tread comprises a contact face 61 intended to come into contact with the roadway when the tyre is being driven on. The tread 6 has tread blocks 63 that are separated by furrows 62 that are oriented substantially circumferentially. Each furrow 62 is delimited radially towards the inside by a furrow bottom 620.

The crown also has a sub-layer 7 disposed radially on the outside of the crown reinforcement 5 and radially on the inside of the tread 6. This sub-layer is formed by three parts: a first base layer 71, a second base layer 72 and a covering layer 73.

The first base layer 71 is disposed radially directly on the crown reinforcement 5. As is known per se, the crown reinforcement has layers of cords or of monofilament reinforcers that are generally coated with a thin layer of rubber. In the context of the present invention, the indication that the first base layer 71 is disposed radially directly on the crown reinforcement 5 means that it is in contact with the cords or reinforcers, not taking the rubber coating thereof into account. It is apparent that the first base layer 71 is disposed axially between the median plane CP and a transition edge 711; the transition edge 711 is situated axially between the median plane CP and a shoulder 60; in this embodiment, there is one transition edge 711 in each of the axial halves on either side of the plane CP.

A second base layer 72 disposed radially directly (see observation above) on the crown reinforcement 5 and axially between the transition edge 711 and a shoulder end 721 can be seen. A covering layer 73 disposed radially on the first base layer 71 and on the second base layer 72 and radially on the inside of the tread 6 and axially at least in portions situated between the median plane CP and the shoulder end 60 can also be seen. Note that, in this embodiment, the material of the tread 6 is visible in the groove bottom 620; the material of the covering layer 73 is thus coated (radially upwardly) by a very thin film of tread material 6.

Figure 2:
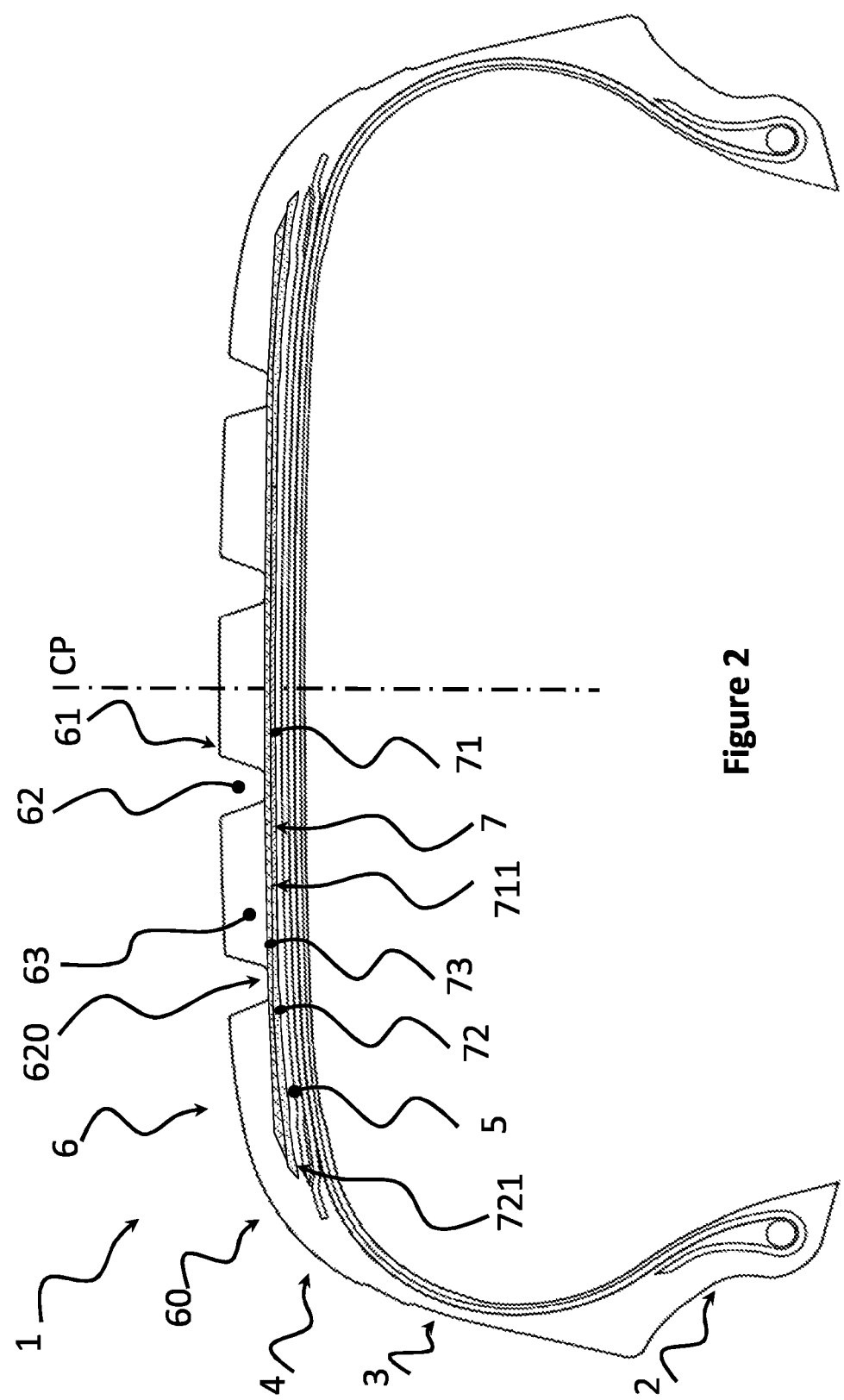
FIG. 2 schematically shows a meridian section through a tyre according to a second embodiment of the invention.

FIG. 2 shows a second embodiment of the invention, very similar to the one illustrated in FIG. 1: in this second embodiment, the material of the covering layer 73 is visible in the groove bottom 620.

The materials used for the sub-layer 7 will now be discussed. In order to characterize them, the dynamic shear modulus $G^*$ measured at 23° C. and under an alternating shear stress at a frequency of 10 Hz and at 10% deformation is used.

Preferably, the material of the first base layer 71 is characterized by a dynamic shear modulus $G^*$ of between 1.5 MPa and 2.5 MPa. These are conventional values for sub-layers of the usual configuration, that is to say ones that are made of a single material and extend axially from one shoulder of the tyre to the other. Advantageously, the tg δ value measured at 23° C. at 10 Hz and under an alternating shear deformation of 10% of the material of the first base layer 71 is less than 0.2.

Preferably, the material of the second base layer 72 is characterized by a dynamic shear modulus $G^*$ strictly less than 1.5 MPa and preferably less than 0.5 MPa; very advantageously, the dynamic shear modulus $G^*$ of this material has a value of 0.3 MPa. In this way, use is made of a material having very low hysteresis in order to lower the rolling resistance of the tyre. This hysteresis is assessed by the tg δ value measured at 23° C. at 10 Hz and under an alternating shear deformation of 10%. Preferably, this value is less than 0.3 and very advantageously, the tg δ value is around 0.05. Thus, the lower dynamic shear modulus of this material and its lower tg δ make it possible to further reduce hysteresis losses in favour of lower rolling resistance.

As for the covering layer 73, the material thereof is preferably characterized by a dynamic shear modulus $G^*$ greater than 7 MPa and preferably greater than 12 MPa; very advantageously, the dynamic shear modulus $G^*$ of this material has a value greater than 20 MPa. In this way, good cornering stiffness is achieved and an excellent performance compromise is obtained, reconciling a drift thrust that is able to give the tyre a good dynamic response and excellent rolling resistance. Advantageously, the tg δ value measured at 23° C. at 10 Hz and under an alternating shear deformation of 10% of the material of the second base layer 72 is less than 0.3.

An example of an appropriate formulation for the material of the first base layer 71, with a dynamic shear modulus $G^*$ of 2.0 MPa, is as follows:

TABLE 1

| Component | phr |
|---|---|
| NR | 60 |
| BR | 40 |
| N683 | 55 |
| 6PPD | 1.5 |
| Stearic acid | 0.5 |
| CBS | 1.5 |
| Sulfur insol 20H | 3 |
| ZnO | 3 |

The formulations are given by weight (phr meaning percentage of the weight of elastomer).

An example of an appropriate formulation for the material of the second base layer 72, with a dynamic shear modulus G* of 0.2 MPa, is as follows:

TABLE 2

| Component | phr |
|---|---|
| NR | 100 |
| Carbon black | 4 |
| 6PPD | 2.2 |
| DPG | 2.1 |
| Stearic acid | 3 |
| ZnO | 1.5 |
| Resin | 29.3 |
| HTO | 38 |
| CBS | 1.4 |
| Sulfur | 1.6 |

The formulations are given by weight (phr meaning percentage of the weight of elastomer).

An example of an appropriate formulation for the material of the covering layer 73, with a dynamic shear modulus G* of 25 MPa, is as follows:

TABLE 3

| Component | phr |
|---|---|
| NR | 100 |
| Carbon black | 70 |
| Phenol-formaldehyde resin | 12 |
| ZnO | 3 |
| Stearic acid | 2 |
| 6PPD | 2.5 |
| HMT | 4 |
| Sulfur | 3 |
| CBS | 2 |

The formulations are given by weight (phr meaning percentage of the weight of elastomer).

As for the material of the tread, according to the invention, the stiffness M thereof is less than the stiffness C of the covering layer. Advantageously, the rubber compound has a dynamic shear modulus G* less than 4.0 MPa and preferably less than 2.5 MPa. By way of example, the material of the tread is the same as the material of the first base layer 71, the dynamic shear modulus G* of which is 2.0 MPa.

The following Table 4 gives an example of a tread formulation:

TABLE 4

| Component | phr |
|---|---|
| SBR (a) | 100 |
| Silica (b) | 110 |
| Coupling agent (c) | 9 |
| Liquid plasticizer (d) | 20 |
| Resin plasticizer (e) | 50 |
| Black | 5 |
| Zinc oxide | 3 |
| Stearic acid | 2 |
| Antioxidant (f) | 2 |
| Accelerator (g) | 2 |
| DPG | 2 |
| Sulfur | 1 |

The formulations are given by weight (phr meaning percentage of the weight of elastomer), with:
(a) SBR with 27% styrene, 1,2-butadiene: 5%, cis-1,4-butadiene: 15%, trans-1,4-butadiene: 80% Tg −48° C.
(b) "Zeosil1165MP" silica from Solvay with BET surface area of 160 m²/g
(c) "SI69" TESPT silane from Evonik
(d) "Flexon 630" TDAE oil from Shell
(e) "Escorez 2173" resin from Exxon
(f) "Santoflex 6PPD" antioxidant from Solutia
(g) "Santocure CBS" accelerator from Solutia A person skilled in the art, who is a tyre designer, could adopt embodiment variants in which the tread itself comprises several different materials that are superposed radially and/or juxtaposed axially.

Figure 3:
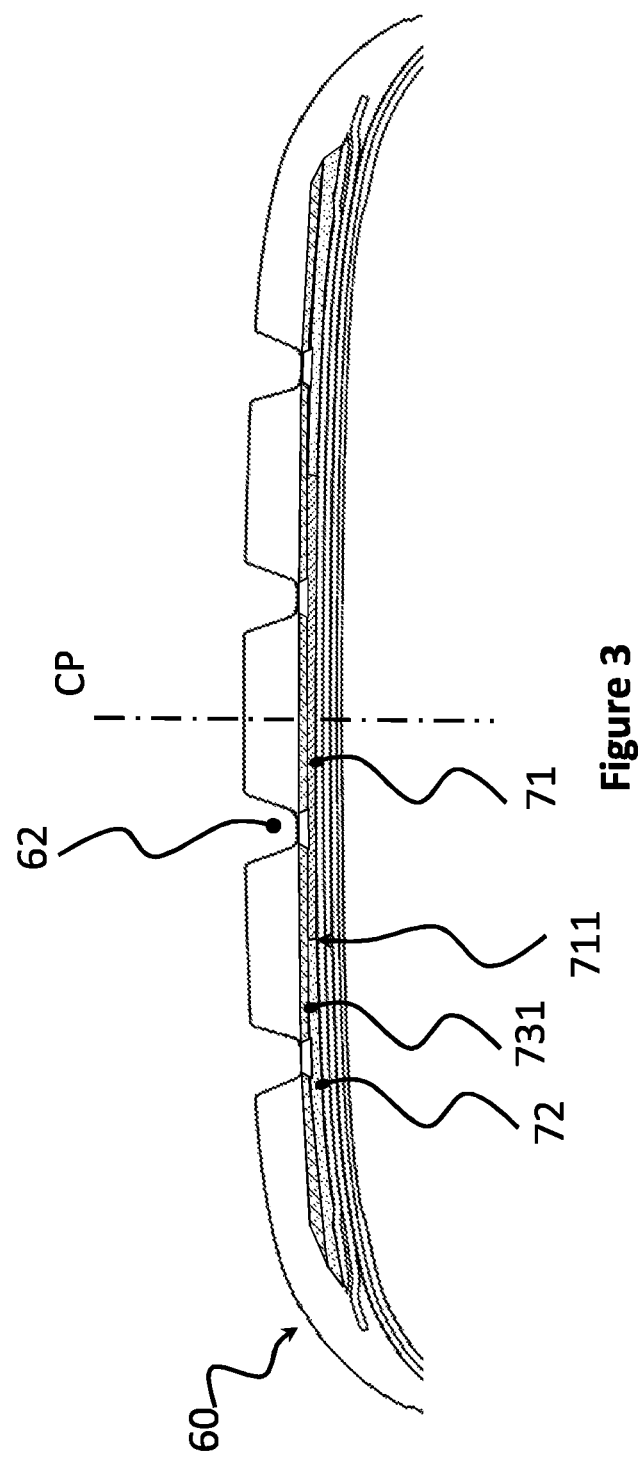
FIG. 3 is a simplified depiction of a third embodiment of the invention.

In the embodiment of the invention illustrated in FIGS. 1 and 2, the covering layer 73 is axially continuous between the two shoulders 60. FIG. 3 shows a third embodiment, in which a covering layer 731 is formed by several portions that are separated axially, said covering layer being interrupted under the furrows 62. At the interruption, the material that is visible at the furrow bottom 620 is the same as the material of the tread 6. Overall, this embodiment makes it possible to significantly improve the rolling resistance at the cost of a very modest worsening in the cornering stiffness.

Figure 4:
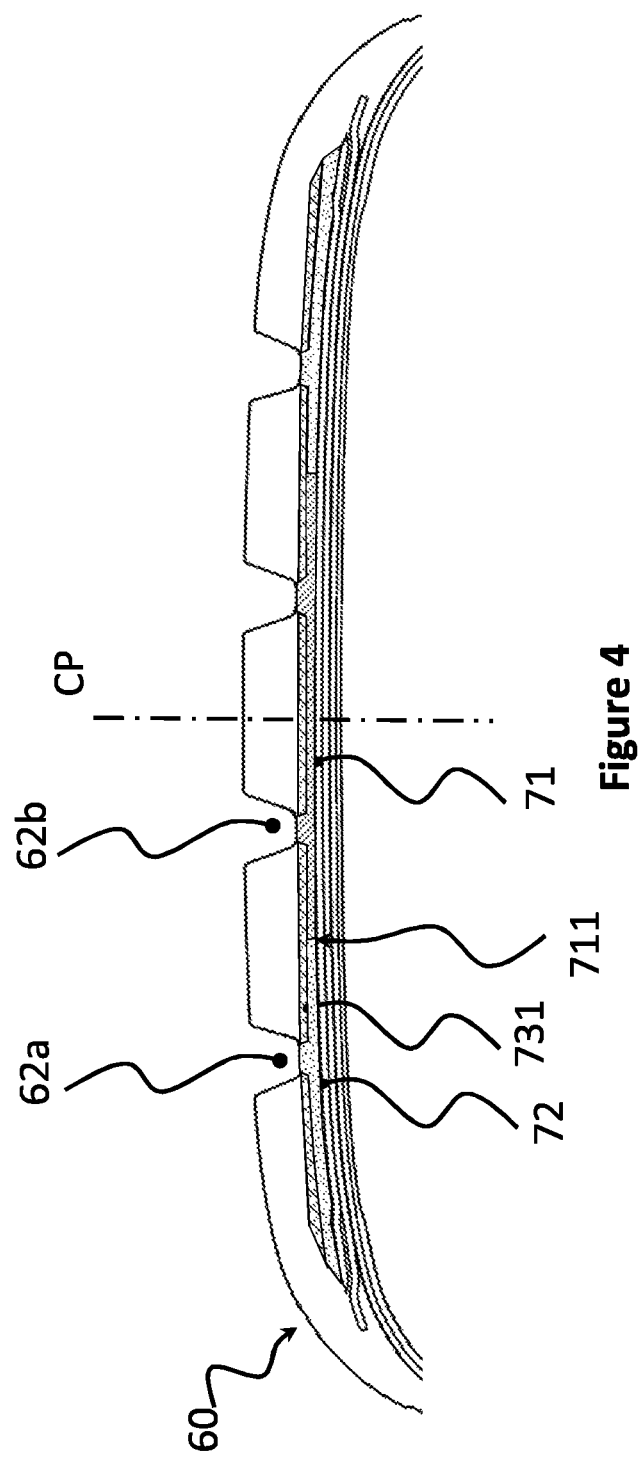
FIG. 4 shows a simplified depiction of a fourth embodiment of the invention.

FIG. 4 illustrates a fourth embodiment of the invention, very similar to the one illustrated in FIG. 3: in this fourth embodiment, at the interruption, the material visible at the furrow bottom 620 is the same as the material of the first (71) or second (72) base layer situated radially beneath the furrow in question; thus, it can be seen that the material of the second base layer 72 is visible at the bottom of the furrow 62a and the material of the first base layer 71 is visible at the bottom of the furrow 62b.

Figure 5:
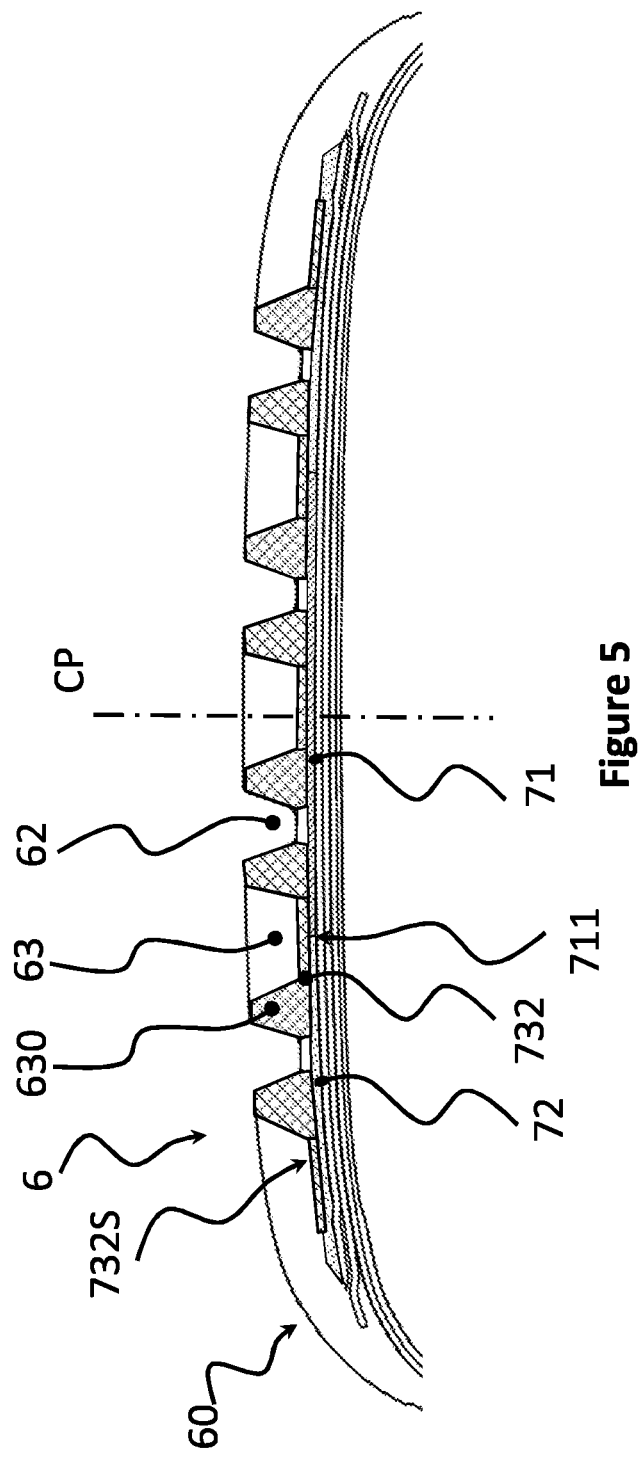
FIG. 5 is a simplified depiction of a fifth embodiment of the invention.

In order to improve the rolling resistance and at the same time to improve the cornering stiffness, it is possible to use wedge-shaped elements 630 in the wearing part of the tread. FIG. 5 illustrates a fifth embodiment, in which a covering layer 732, axially at some tread blocks 63, is extended radially outwards by a wedge-shaped reinforcing element 630 (seen in meridian section). This reinforcing element 630 extends radially from the radially outer surface 732S of the covering layer 732 towards the outside of the tread 6 to a radial height greater than 75% of the radial thickness of the tread. Said reinforcing element 630 is of variable axial width, from a maximum value less than 50% of the axial width of said tread block, said axial width decreasing radially upwardly. The angle formed in radial section by the two lateral walls of said reinforcing element 630 is preferably between 10° and 50°, specifically for example 40°, as illustrated in FIG. 3. The tread has such a reinforcing element 630 on either side of each furrow 62. Each reinforcing element is advantageously made up of the same rubber compound as the covering layer 732, thereby making it possible to extrude them in one and the same operation with the covering layer 732.

Tests

As control, use is made of a tyre R having a tread made of a compound with a dynamic shear modulus G* of 3.0 MPa, and a single-material sub-layer extending axially from one shoulder of the tyre to the other and having a thickness that is radially substantially constant; as seen in radial section, the profile of this sub-layer is the same as the profile of the assembly of the first base layer 71; this sub-layer is formed by a compound having a dynamic shear modulus G* of 2.0 MPa. A first test tyre T1 is in accordance with the example of the invention that is illustrated in FIG. 1, using the materials illustrated in Tables 1 to 4. A second test tyre T2 is in accordance with the example of the invention that is illustrated in FIG. 3 (covering layer 731 interrupted), using the materials illustrated in Tables 1 to 4. A third test tyre T3 is in accordance with the example of the invention that is illustrated in FIG. 5 (this example combines an interrupted covering layer with reinforcing elements 630 on either side of each furrow 62, these two embodiment aspects being able to be used independently of one another), using the materials illustrated in Tables 1 to 4. The rolling resistance value (kg/T) and cornering stiffness value Dz (N/°) are with respect to the base 100 for the control R and expressed as relative values with respect to the base 100 for the tyres according to the invention. The measurement of the cornering stiffness of a tyre makes it possible to evaluate the road holding of a vehicle through the capacity thereof to react during an action on the steering wheel or to follow the trajectory of a bend. This cornering stiffness is measured on an apparatus and consists in causing a tyre mounted on a rim and inflated to a nominal pressure to roll on a bonded metal strip, by means of a machine of the "Flat Track" type. The measurement is taken when the tyre is rolling at 80 km/h with a chain of stresses varying the load, cornering and camber conditions. The rolling resistance can be measured in accordance with the standard ISO28580.

TABLE 5

|  | Cornering stiffness (with respect to a base 100) | Rolling resistance (with respect to a base 100) |
| --- | --- | --- |
| Tyre R | 100% | 100% |
| Tyre T1 (FIG. 1) | 92% | 109% |
| Tyre T2 (FIG. 3) | 87% | 109% |
| Tyre T3 (FIG. 5) | 121% | 112% |

It will be noted that the invention allows the performance compromise between rolling resistance and cornering stiffness to be moved; it allows a very significant improvement in the rolling resistance at the cost of a reduction in the cornering stiffness that is quite acceptable for applications to passenger vehicles in which the desired performance is especially rolling comfort. It will also be noted that, by adopting the fifth embodiment, a very large increase both in rolling resistance and in cornering stiffness is achieved.

The invention claimed is:

1. A tire, having an axis of rotation and a median plane CP perpendicular to the axis of rotation, comprising:
   a crown reinforcement;
   a tread radially on the outside of the crown reinforcement, the tread extending axially between two shoulders, the tread comprising a contact face intended to come into contact with a roadway when the tire is being driven on, the tread having furrows oriented substantially circumferentially, and the tread being made up of at least one rubber compound of stiffness M; and
   a sub-layer disposed radially on the outside of the crown reinforcement and radially on the inside of the tread, wherein, at least on one side axially with respect to the median plane CP, the sub-layer has:
   a first base layer disposed radially on the crown reinforcement and axially between the median plane CP and a transition edge, the transition edge being situated axially between the median plane CP and a shoulder, and the first base layer being made up of a rubber compound of stiffness A,
   a second base layer disposed radially on the crown reinforcement and axially between the transition edge and a shoulder end, the second base layer being made up of a rubber compound of stiffness B, and
   a covering layer disposed radially on the first base layer and on the second base layer and radially on the inside of the tread and axially at least in portions situated between the median plane CP and the shoulder end, the covering layer being made up of a rubber compound of stiffness C,
   wherein stiffness B is less than stiffness A, which is less than stiffness C, and stiffness C is greater than stiffness M,
   wherein the covering layer is formed by several portions that are separated axially, the covering layer being interrupted under the furrows,
   wherein a dynamic shear modulus $G^*$ of the rubber compound of the first base layer is between 1.5 MPa and 2.5 MPa,
   wherein a dynamic shear modulus $G^*$ of the rubber compound of the second base layer is less than 0.5 MPa, and
   wherein the dynamic shear modulus $G^*$ of the rubber compound of the covering layer is greater than 20 MPa.

2. The tire according to claim 1, wherein a tg δ value measured at 23° C. at 10 Hz and under an alternating shear deformation of 10% of the rubber compound of the first base layer is less than 0.2.

3. The tire according to claim 1, wherein a tg δ value measured at 23° C. at 10 Hz and under an alternating shear deformation of 10% of the rubber compound of the second base layer is less than 0.3.

4. The tire according to claim 1, wherein a tg δ value measured at 23° C. at 10 Hz and under an alternating shear deformation of 10% of the rubber compound of the second base layer is less than 0.3.

5. The tire according to claim 1, wherein the tread has tread blocks that are separated by furrows oriented substantially circumferentially, and
   wherein the covering layer, axially next to some tread blocks, is extended radially outwards by at least one reinforcing element extending radially from the radially outer surface of the covering layer toward the outside of the tread to a radial height greater than 75% of the radial thickness of the tread, the reinforcing element having a variable axial width, from a maximum value less than 50% of the axial width of the tread block, the axial width decreasing radially upwardly.

* * * * *